UNITED STATES PATENT OFFICE.

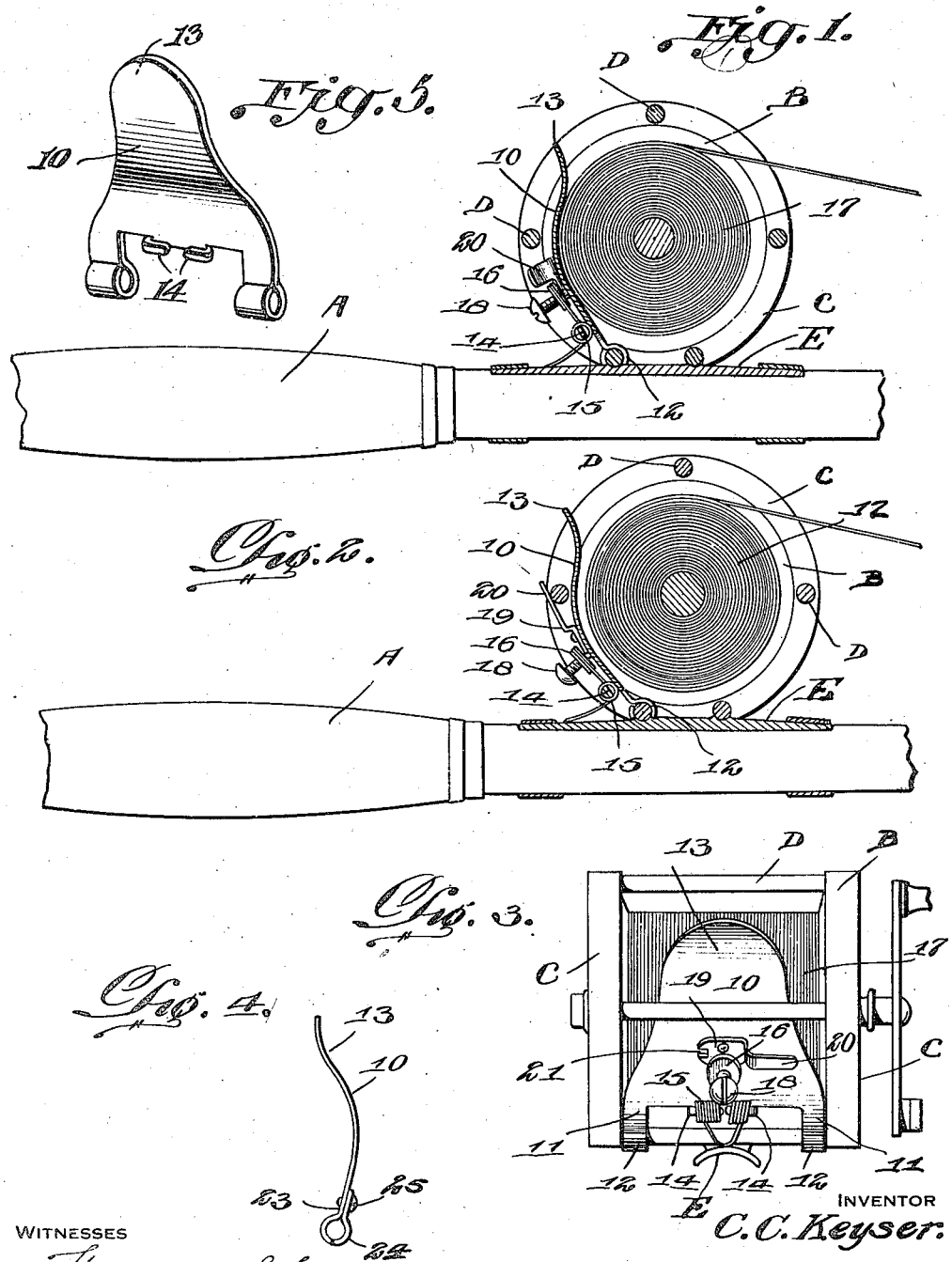

CHARLES C. KEYSER, OF PENSACOLA, FLORIDA.

FISHING-REEL ATTACHMENT.

1,299,959.   Specification of Letters Patent.   Patented Apr. 8, 1919.

Application filed April 13, 1917. Serial No. 161,811.

*To all whom it may concern:*

Be it known that I, CHARLES C. KEYSER, a citizen of the United States, residing at Pensacola, in the county of Escambia and State of Florida, have invented new and useful Improvements in Fishing-Reel Attachments, of which the following is a specification.

This invention comprehends the provision of an automatic thumber attachment for fishing reels or the like, and by means of which the reel is checked against movement after the momentum of the casting is spent, thus preventing backlashing and tangling of the line, when the latter is cast in the usual manner.

One of the chief characteristics of the invention resides in the provision of a construction and an arrangement of parts, whereby the attachment can be held wholly out of contact from the reel, and the coils of the line about the reel, when its use is not desired, such as for instance in a very light bait casting.

More specifically stated, the invention embodies a pivotally mounted plate, which when in use is yieldably held against the coils of the line about the reel, with a pressure that is sufficient to permit the reel to properly pay out the line while the casting is being made, but which also serves to check the movement of the reel when the momentum of the casting has been spent, with a view of preventing backlashing and tangling of the line.

In carrying out the invention I further provide means whereby the yieldable means can be readily and quickly adjusted, to regulate the pressure against the thumber attachment for the purpose above mentioned.

The nature and advantages of the invention will be better understood from the following detail description when read in connection with the accompanying drawing, the invention residing in the construction, combination and arrangement of parts as claimed.

In the drawing forming part of this specification like numerals of reference indicate similar parts in the several views and wherein:—

Figure 1 is a transverse sectional view through the reel showing the attachment in position for use.

Fig. 2 is a similar view showing the manner of holding the attachment in an inactive position.

Fig. 3 is a side elevation.

Fig. 4 is a detail view of a modified form of the plate forming part of the attachment.

Fig. 5 is a detail perspective view of the plate detached.

Referring more particularly to the drawing in detail, A indicates a portion of the rod, while B indicates generally the reel of any well known construction, which is attached to the rod A in any suitable manner. The reel as stated may be of any well known form, and embodies in part the side plates C which are connected by the rods D mounted on a supporting plate E.

The attachment forming the subject matter of my invention preferably consists of a plate 10 which in accordance with one form of the invention is provided with end extensions 11 which terminate to provide loops 12 which embrace one of the rods D in the manner whereby the plate is pivotally supported. The plate is preferably though not necessarily supported on the rod D interposed between the reel and the rod A, the plate being longitudinally curved to accommodate itself to the reel, and terminating so as to provide an outwardly flared thumb engaging portion 13. The opposite edge of the plate is cut to provide a pair of bendable tongues 14, the latter being bent in a direction toward each other to provide a support for a coil spring 15. The tongues 14 as shown are received by the convolutions of the spring, to support the latter, while the terminals of the spring support a smaller nut 16 for the purpose to be hereinafter described. The nut is secured in any convenient manner to the terminals of the spring, whereby these parts are held associated. The intermediate portion of the spring projects from the plate at an angle thereto, and is suitably pressed against the rod A, whereby the spring and plate 10 is always under tension. The end of adjusting screw 18 of course bears against the plate 10 whereby the latter is yieldably supported.

The construction thus far described produces what is termed an automatic thumber for fishing reels or the like, and with the parts positioned in the manner illustrated in Fig. 1, wherein the plate 10 yieldably presses against the coils of the line 17 about the reel, the reel is permitted to properly pay out the line while the casting is being made, but when the momentum of the casting has been spent, the plate 10 serves to check further movement of the reel, thus obviating backlashing and tangling of the line as will be readily understood. With a view of maintaining the plate 10 under proper tension for this purpose, I preferably employ an adjusting screw 18 which is threaded through the opening in the nut 16, and it is obvious that by adjusting the screw the tension of the spring 15 can be properly regulated.

It is frequently necessary while fishing, to allow the line to unwind from the reel, to prevent breaking the line, when a large fish which engages the submerged end of the line attempts to get away, and in such instances it is desirable to exert pressure against the coils of the line about the reel, to gradually retard the movement of the fish through the water, in a way that will not break the line. While the plate 10 is yieldably supported by means of the spring 15, the pressure exerted on the plate through the instrumentality of the spring is not sufficient for this purpose, but in order to accomplish this end it is only necessary for the user to exert additional pressure by the thumb against the portion 13 of the plate, the latter being arranged in the most convenient and advantageous position for use in this manner.

With a view of wholly maintaining the plate 10 out of contact with the reel and line, when use of the attachment is not desired, as for instance for a very light bait casting, I preferably make use of a latch element 19 which is pivoted at a point in its length upon the plate 10. One extremity of the element 19 is offset as at 20 and disposed in spaced relation to the plate, so that when the plate is moved out of engagement with the reel and line, this offset extremity can be engaged behind the adjacent rod D in the manner clearly shown in Fig. 2. The element 19 is swung upon its pivot in the proper direction to position the latch element behind the rod D, and can be very conveniently manipulated when it is desired to either hold the plate out of contact with the reel or line, or to permit the plate to assume its active position relative thereto. As shown in Fig. 3 one end and one side of the element 19 is cut away to provide notches 21 which alternately receive the end of adjusting screw 18, whereby the lashing element 19 is held fixed relative to the plate 10 in either of its adjusted positions. It might here be stated that the plate 10 by preference is coextensive in width with the width of the reel so that the plate when in use engages all of the coils of the line, whereby the line is properly governed while the casting is being made, while this disposition of parts also provides for the even and proper winding of the line about the reel.

In Fig. 4 I have disclosed a modification of the plate 10, in which instance the extensions 23 are not looped at the end in the manner hereinabove described, but are formed as shown to coöperate with the hook-like element 24 to define a clamp, by means of which the plate can be quickly associated with or removed from the rod D. The element 24 is secured to the extension 23, and adjustable toward and away therefrom through the instrumentality of the screw or similar fastening element 25.

While it is believed that from the foregoing description the nature and advantages of the invention will be readily apparent, I desire to have it understood that what is herein shown and described is merely illustrative of the preferred embodiment of the invention to which I do not limit myself, and that such changes may be resorted to when desired as fall within the scope of what is claimed.

What is claimed is:—

1. The combination with a fishing reel including spaced transverse rods, of a plate pivotally mounted on one of said rods, resilient means for yieldingly pressing the plate against the line on the reel, and a latch pivoted on said plate and engageable with another of said transverse rods whereby said plate may be held out of engagement with the line.

2. In combination with a fishing reel including spaced transverse rods, a plate pivotally mounted on one of the rods, a spring yieldably urging said plate into engagement with the line carried by the reel, and a latch member pivoted upon said plate and revoluble upon the face thereof and having one end offset from the plate and engageable with another of said transverse rods for holding said plate out of engagement with the line.

3. In combination with a fishing reel including spaced transverse rods and a supporting plate, a plate pivotally mounted on one of said rods, a coiled spring carried by said plate and having one end engaging the supporting plate of the reel, a washer provided in its periphery with a groove, the other end of said spring being disposed within said groove whereby said washer will be supported by the spring, and a screw threaded through said washer and bearing against said plate whereby said plate will be held in engagement with the line carried by the reel.

4. In combination with a fishing reel including spaced transverse rods and a supporting plate, a plate pivotally mounted on one of said rods, lugs stamped from said plate and bent to extend in end to end relation to each other, a spring having its intermediate portions formed into two coils disposed respectively on said lugs and having one portion bearing upon said supporting plate, a washer carried by said spring, and a screw threaded through said washer and bearing against said plate for holding said plate in engagement with the line carried by the reel.

5. In combination with a fishing reel including spaced transverse rods, a plate pivotally mounted on one of said rods, resilient means for yieldably pressing said plate against the line on the reel, a latch member pivoted upon said plate and revoluble upon the face thereof, an offset extension on said latch member movable into engagement with another of said transverse rods whereby said plate may be held out of engagement with the line, and means for holding said latch member in its selected position.

In testimony whereof I affix my signature.

CHARLES C. KEYSER.